June 16, 1925. 1,542,445
E. L. GRAUEL
LOCKING DEVICE CONTROL
Filed Nov. 4, 1922 5 Sheets-Sheet 2

INVENTOR:
Edwin L. Grauel
BY
ATTORNEYS.

June 16, 1925.

E. L. GRAUEL

LOCKING DEVICE CONTROL

Filed Nov. 4, 1922      5 Sheets-Sheet 4

INVENTOR:
Edwin L. Grauel
BY
ATTORNEYS.

Patented June 16, 1925.

1,542,445

UNITED STATES PATENT OFFICE.

EDWIN L. GRAUEL, OF CINCINNATI, OHIO.

LOCKING-DEVICE CONTROL.

Application filed November 4, 1922. Serial No. 599,068.

*To all whom it may concern:*

Be it known that I, EDWIN L. GRAUEL, a citizen of the United States, and a resident of Cincinnati, in the county of Hamilton and State of Ohio, have invented certain new and useful Improvements in Locking-Device Controls, of which the following is a full, clear, and exact description, reference being had to the accompanying drawings, forming part of this specification.

My invention relates to locking devices for automobiles more particularly, but may be used for other purposes of lock protection if desired.

I am aware that a great many different forms of lock for motor vehicles have been devised and many gone into use, but it is a significant fact that but very few have been recognized by theft protection bureaus or laboratories, and these few all fail in the one point, namely, that they require some thought and action upon the part of the driver to lock his car when leaving the same. It is the primary object of my invention to force the driver to bring his car to locked position whenever he voluntarily stops his car.

As will be noted, I have applied my invention to gas or fuel locking means, which I conceive to be the best means for locking a motor vehicle, since it permits driving of the vehicle for a limited distance, prevents leakage of fuel where applied to the gasoline line, acts as a fuel saver, and limits the action of the vehicle in one of the least easily substituted portion of its mechanism. It also permits the car to be moved about as required by many city ordinances.

Referring to the primary object of my invention, it will be evident that no lock should be placed on a vehicle which requires operation whenever the vehicle wheels stop turning, as in stopping at a crossing or stalling of the motor, since dangerous results might follow. However, when leaving a motor vehicle, the driver always shuts off his ignition switch, unless he desires to leave his engine running, which he would very rarely do. Indeed, every driver knows that to leave a car with the engine running is an invitation to thieves to mount and drive away the vehicle, and in many places it is against the law.

On the above assumption, my invention is based on the arrangement of electrically operated parts to come into operation to lock the vehicle against molestation at every turning off of the ingition switch thereof.

With the ignition switch as the prime mover, or some other constantly operated member as the prime mover of the car lock, my invention requires the opening of a combination or key controlled switch lock followed by a closing thereof to locked position prior to releasing the lock of the vehicle for authorized driving. Thus whenever the vehicle is in motion, the lock will have to be set, and the driver by turning off his ignition, even if he leaves the ignition key in place, will lock the vehicle without any other thought or motion.

While I appreciate that there are various ways in which this can be accomplished, I have chosen to illustrate one form of my invention by a pair of magnets, one of which when current is passed through it will move an engine locking member to unlocked position, and the other of which is required to be energized prior to forming a circuit to the one first mentioned. Thus in the instance of a switch lock to be opened and closed, the opening movement of the switch lock will operate the second magnet just mentioned and the closing of it will operate the first magnet above mentioned, while the ignition switch will serve to make or break all connections to both magnets, thereby releasing both magnets whenever it is moved to circuit breaking position.

With an electrically operated device of this character I have developed a series of circuits, whereby the tampering with them will be made as difficult as possible, and the shorting of all wires in them will give no operation. I have also developed means to prevent the energizing of them by electromagnetic and inductive means brought into proximity therewith.

I have developed a method of mounting and protecting the various parts of the lock, which will require more labor than a thief has time to expend, to get at the lock and switch, and by making the vehicle locking device self-closing unless positively energized I have provided against getting at the said locking device in any way except actually dismounting the locked parts and substituting others.

In connection with the gasoline lock of my particular form of device illustrated, I have so designed the parts as to most effectually prevent unauthorized access to them, and have worked out a form of valve which will not be forced into open position by pumping up artificial pressure in the gas or air lines of the vehicle.

There are various other advantages developed by me in the special embodiment of the invention to be described, and I accomplish my objects stated, and those to be noted by that certain construction and arrangement of parts to be hereinafter more specifically pointed out and claimed.

In the drawings,

Figure 1 is a sectional view taken through the various essential parts of my invention, showing the mechanical construction thereof.

Figure 1ª is a detail section of the switch device.

Figure 2 is a wiring diagram of my preferred form of circuit.

Figure 2ª is a detail of valve plunger.

For convenience in understanding the device I will refer first to the preferred form of electric control circuit before dealing with the mechanical features of the device.

*Electric circuits.*

It will be recalled from the introductory statement that the electric circuits for operating the vehicle lock comprise an ignition switch and battery circuit, a lock switch having two positions (i. e. double throw) and two electro-magnets with their circuits, one magnet having control over the circuit of the other.

Figures 1, 1A, 2, 2A:
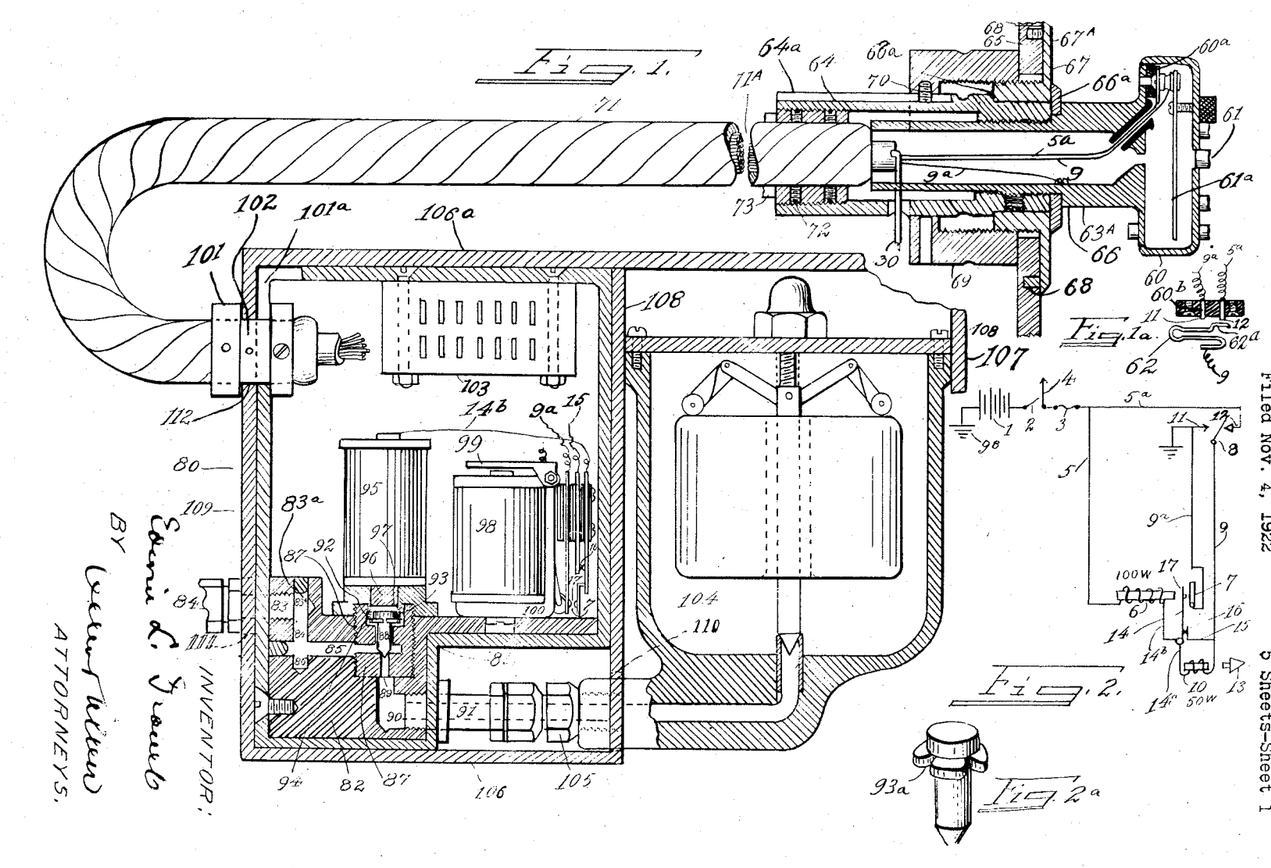

Referring to the preferred circuit in Figure 2, 1 is a battery, 2 the ignition switch, 3 a fuse located in the lead from the ignition switch to the lock and closed adjacent the ignition switch, and 4 the lead from the ignition switch to the usual ignition system of the vehicle. The lead 5 extends from a point beyond the fuse 3 to a relay coil 6 having an armature 7. The armature 7 is connected to a ground lead 9ª and the battery is also grounded at 9ᴮ.

The lock switch having a double throw is indicated at 8, the movable member of which is connected by a lead 9 with the magnet coil 10. The contact 11 of the lock switch is connected to ground, and the contact 12 by means of the lead 5ª to the ignition switch. 13 indicates a movable member acting as an armature of the coil 10 and also as a vehicle locking member spring-pressed away from contact with the coil core. Connected to the other terminal of the coil 10 is a contact piece 14, lying in the path of the armature 7 of the relay 6. This contact piece 14 has also a contact at 16, with a short circuiting wire 15 for the coil 10.

The parts are so arranged that when the armature 7 is attracted to the relay core, the contact piece 14 lies in its path, and the contact with the wire 15 is not broken until after 7 has come into contact at 17 with the piece 14.

The position of the parts of the circuit are illustrated in locked position in which they normally remain when the vehicle is standing or coasting with the ignition switch turned off. The double throw switch is in its locked position when 12 is in contact with the terminal of the lead 9 to the coil 10.

The driver may in this position turn on his ignition switch with no effect on either relay or coil, since the ground is disconnected from the circuit at contacts 11 and 17, and no flow will result.

The relay 6 is wound with a resistance of, say, 100 ohms, and the coil 10 with a resistance of, say, 50 ohms.

When the driver has closed the ignition switch he then operates the switch lock and throws the switch to position in engagement with contact 11. This permits flow of current from the ignition switch through relay 6 along lead 14ᵇ to contact member 14 through contact 16 and through the short circuit 15, which shorts out the coil 10, to the lock switch point and ground contact 11.

As soon as the armture 7 moves it closes electric contact 17, thereby connecting one of the relay terminals with the ground creating a permanent circuit through the relay 6 until the ignition switch is turned off, when the armature will spring away of its own resiliency.

The closing of the armature 7 connects the one terminal of the coil 10 with the ground of the armature, but this does not as yet send any current to operate the coil 10 through its circuit, since coil 10 is shorted at contact 11.

The next step requires the operator to throw over the lock switch to locked position, establishing contact at 12 with the lead 9 to the coil 10, and sending a current through the coil 10. Thus current passes along the lead 5ª, thence through the coil along the lead 14ª to the contact element 14 and thence by contact 17 to the armature 7 and to the ground.

As soon as this circuit is established the current from the battery divides itself, part maintaining the armature 7 closed, and part serving through the coil 10 to draw and hold the vehicle locking member 13 into vehicle releasing position.

An additional reason for the short circuiting wire 15 is to insure against current being inductively generated by tampering persons to operate the lock. It also acts in a make-before-break manner to set up a vibratory action of the armature 7 in case a person tampering with the circuit would select the wrong wires in an attempt to accomplish the switch action. Imagining the lock switch to be making both of its contacts at once, then either the fuse or the wires would burn out because of direct ground. If extra wires were used, as in a camouflaged circuit, so that leads from the coils and the armature ground came up to the lock, then a chance closing of circuits through the coil 10 and relay 6 simultaneously by tampering would result in a short as soon as contact was made by the armature 7 with the contact member 14 by current passing through the short 15, the contact 14 and the armature 7 to the ground. This would entirely kill any current through the relay 6 and would release the armature, whereupon the same cycle would be repeated with the effect of a "buzzer" and without positive action.

One of the obvious ways to tamper with the circuit above described would be to cut the protective casing or conduit that houses the wires and connect them up to bring about the desired results. To prevent this I have provided for camouflaging the circuits by passing a large number of wires into a hollow conduit with the essential wires, so that upon cutting the mass at any point it would be an interminable job to find the desired ones.

In order to prevent elimination of the correct from the incorrect wires I have provided for connecting the various leads to the terminals of the coil indiscriminately.

Figures 3, 4:
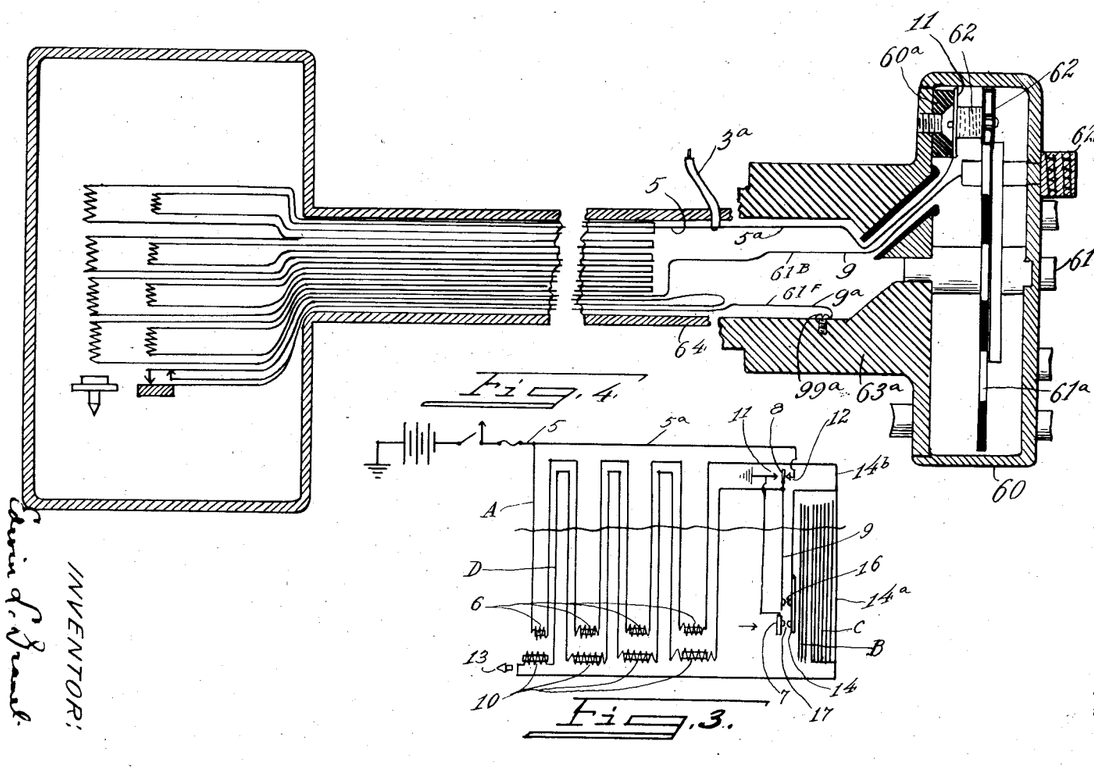
Figure 3 is a wiring diagram showing the method of protecting the main circuit against tampering.
Figure 4 is a partially diagrammatic sectional view, showing the method of locking the circuits and camouflaging wiring into the protective hollow cable.

Thus in the diagram of Figure 3 it will be noted that I have connected to the lead 5 close to the fuse, a false wiring system of wires A, which are connected to a series of taps off a few coils of the relay 6 and thence looped back and connected to more taps again several times over. The diagram appears to show a series of relays, but these are all the one relay shown a number of times to illustrate a set of four coil sections. Also the direction of action on the armature 7 is reversed over Figure 2 for ease of illustration. Open wires B and shorted wires C would preclude bunch tests. The wires D or a single wire looped back on itself to form a closed circuit may be connected to taps from the lock coil 10 in the same manner as wires A are connected to the relay. To get enough power to operate the device not only the correct taps to relay and to valve coil must be found but they must be poled properly in relation to each other.

I have not attempted to indicate the only form of faking extra circuits, but have purposely placed within the wire containing case or cable, a series of circuits that short the coils of the relay and the lock coil.

I also desire that these extra wires be securely anchored within the cable, so that free ends cannot be pulled out, thereby eliminating the correct wires from the incorrect; and also the wires in my system are fine, say 30 gauge enamel insulated, so as to burn out if high current be sent through them in an attempt to operate with sections of the coils and so as to make removal of insulation difficult.

*The additional circuits.*

I have shown in Figures 10 to 20 a set of circuits, any one of which would serve my purpose.

Figure 10:
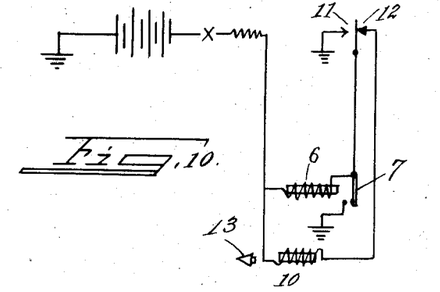
Figures 10 to 20 are diagrams of other forms of circuits.

In Figure 10 the relay 6 and its armature 7 and the lock coil 10 are so arranged that upon making contact 11, the relay will attract its armature, locking its own ground for the relay. The closing of the switch to contact 12 will permit current to flow around through the switch from the armature ground, through the lock coil 10 and back to the ignition switch and battery, or vice versa.

Figure 11:
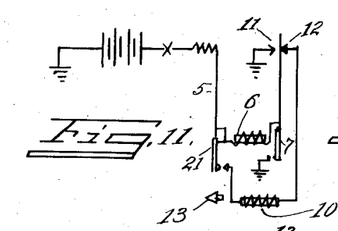

In Figure 11 making of contact 11 draws armature 7 to establish the ground and at the same time draws the armature 21 to a position to connect up the lock coil, so that upon establishing of the contact 12, the current will flow around through the lock coil and back to the armature ground, as is the case in Figure 10. The relay will be held closed by current through lead 5, through the armature 7 to the ground.

Figure 12:
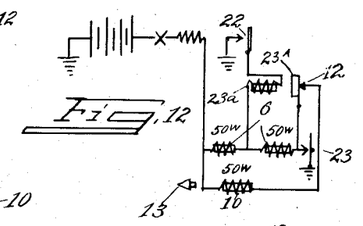

In Figure 12 the lock switch is shown as being formed of a single throw switch 22 closing when the lock is opened, and an armature 23 restoring when the switch is closed. In this structure the relay 6 is divided into two fifty ohm sections by a lead passing through an additional relay 23ª and extending to the switch 22. Upon closing switch 22 the relay acting with half of its power draws over the armature 23 until it establishes a direct ground through both 50 ohm sections of the relay, and also establishes a ground at the same time for the armature 23^A, which is held out of contact at 12 by the relay 23^B until the lock is closed. Closing of the lock will then send current around through the valve coil 10, because of the release of the armature 23^A which springs to contact 11, the ground for the relay being maintained at 23.

Figure 13:
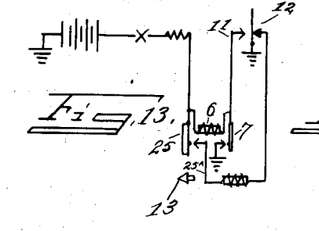

In Figure 13 the movable member of the double throw switch is connected to the ground, as at 12. Contact 11 is connected to the relay 6 and the armature 7 is used as well as an armature 25. Establishing of contact 11 lets current flow through the relay to the ground of the lock switch, thereby causing the armature 7 to set up its own ground and armature 25 to establish contact with the lead 25^A to the lock coil, so that upon establishing contact 12 with the lock switch the lock coil will be energized by current by passing the relay.

Figure 14:
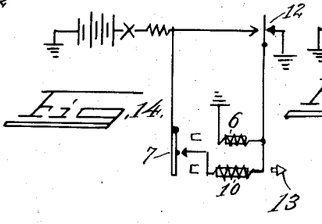

In Figure 14 the relay 6 has its armature 7 electrically connected directly with the ignition switch. The armature swings so that it closes circuit through the lock coil in series with the relay, but the high ohmic resistance of the relay prevents the lock coil from operating.

In view of the fact that the two coils are in series, a permanent ground is established for the relay while the lock switch is being thrown to its contact 12, which contact is grounded. This will permit the full current from the battery to pass through the valve coil, which magnetically holds armature 7.

Figure 15:
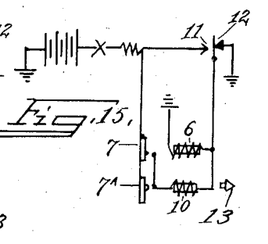

In Figure 15 the relay 6 is the same as in Figure 14, and there are two armatures 7 and 7^A, the latter being independent mechanically but in series electrically with the former. The lock switch at contact 11 closes circuit through the relay coil to the relay ground, and attracts the armature 7 which makes contact with the lock coil, so that current is sent in series through the lock coil and around to the relay ground, thereby holding the relay armature in position during the moment of throwing the lock switch to ground contact 12. When thrown to ground contact 12, the armature 7^a is attracted by the valve coil, making the continued contact of the armature 7 no longer necessary.

Thus circuits of Figures 14 and 15 differ from the above in the fact that the differential resistance is relied upon to enforce the sequential operation of the two coils.

Figures 16, 17, 18, 19:
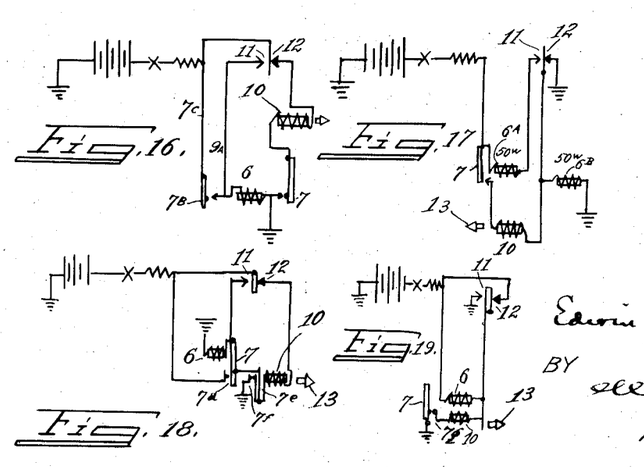

The circuit of Figure 16 shows the relay 6 with two armatures 7 and 7^B, the latter being in series with the lock coil. The relay has its own ground and is connected by a lead 9^A with the lock switch contact 11. The lock coil is connected to the switch contact 12. When the switch is thrown to contact 11, the two armatures are attracted to the relay, connecting the lock coil to a ground from the armature 7 and providing a separate line through the armature 7^B and the lead 7^c to the battery. This will hold the relay closed, so that when the lock switch is thrown to contact 12, the lock coil will get current through the switch and the armature 7 and its ground.

In Figure 17 the throwing of the lock switch to contact 11 will send current through half of the relay, as indicated at 6^A, and through the switch arm along the lead therefrom to the other half of the relay at 6^B and to the ground of this other half of the relay. The armature 7 makes contact with both the relay and the lock coil 10 when the circuit is so established, and the lock coil and half of the relay in series will hold the armature and provide the permanent ground while the switch is being thrown to contact 12, which is grounded. When this happens the grounded half of the relay still retains current and holds over the armature and maintains its own contact so long as the lock switch is held against contact 12.

In Figure 18 the throwing of switch to contact 11 will send current through the switch, through relay 6 and to the ground of the relay. This pulls over armature 7, which then establishes contact at 7^d, so as to establish a self-sustained current through the relay to its ground. The armature 7 is mechanically connected to the armature 7^e, which is electrically connected to the lock coil and makes contact at 7^f while the armature 7 is making its contact at 7^d. The contact of 7^f is grounded, so that when the lock switch is thrown to contact 12, which is directly connected to the lock coil, the lock coil will receive current through the switch to the ground that is maintained by the branch circuit through the relay.

In Figure 19 the throwing of lock switch to contact 11 will send current through the relay to the ground of the contact 11, thereby establishing by means of the armature 7, which is grounded, a sustained current through the relay. The armature 7 has also a contact at 7^g with the lock coil, so that the lock coil can be energized by throwing the lock switch to contact 12, which is directly connected with the lock coil. The armature when pulled over sends current through the relay and lock coil in series to the ground, same being insufficient to hold the lock coil so as to permit it to operate, but while the switch is being thrown to contact 12, the series coils will hold the armature over, as in the form in Figure 14, the establishing of contact 12 serving to send direct charge through the lock coil to the ground of the armature. Coils 6 and 10 hold the armature 7 when contact 11 is broken.

It will be noted of all the forms that the relay must first be operated and then the lock coil when prepared by the relay armature, and that the amount of current required to operate the coils is very small, due to their high ohmic resistance and low voltage used.

Figure 20:
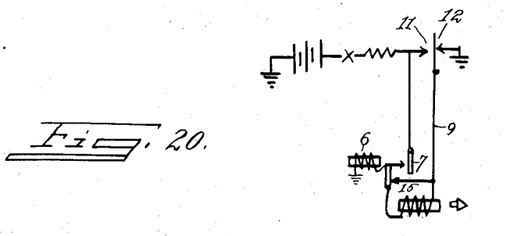

In Figure 20 the throwing of switch to contact 11 will send current through wire 9, short circuit wire 15 to relay 6 and its ground. This will attract the armature 7, thereby establishing a current from switch point 11 through the armature to the relay and thence to its ground, which current will be permanent until the ignition switch is opened. By throwing over the switch to contact 12 current will pass down through armature 7, through the lock coil and back to the ground of the contact 12. The same make-and-break device is used as in Figure 2, except that the ground and battery connections to the switch contacts 11 and 12 have been reversed.

Figure 21:
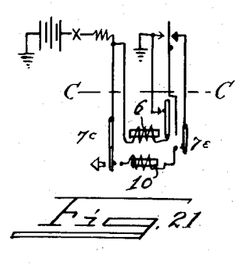
Figures 21 to 25 are diagrams showing alternative camouflaged circuits.

In Figure 21 is shown an alternative method of camouflaging the circuit in which in a circuit similar to that of Figure 11, there are two extra armatures $7^e$ used for the relay, which armatures must be operated to send current through the lock coil. All armatures have separate wires connecting them with the switch and power terminals and extended up in the cable, so that upon a cutting of wires as at C—C, the chances of lining up again are made more difficult.

Figure 22:
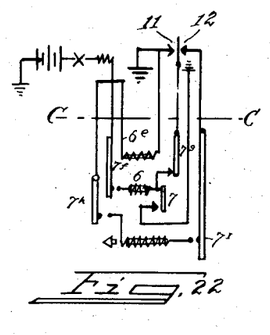

In Figure 22 there is shown an extra relay $6^e$, which, whenever the ignition switch is closed, will pull over armatures $7^f$ and $7^g$. These armatures will then prepare the relay 6 for operation when the switch 8 is thrown to contact 11, and will also set up permanent ground from the relay 6 by means of the regular armature 7. Armatures $7^h$ and $7^i$ will be operated only by the relay 6 and thus will set up through armatures $7^h$ and $7^i$ a circuit ready for throwing of the switch to contact 12. In this arrangement there are numerous armature wires extending to the lock device, so that it will be increasingly hard to test out all wires properly.

Figure 23:
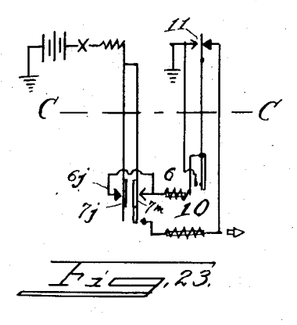

In Figure 23 the relay 6 gets its current at one end through an armature $7^j$ normally in contact with the wire $6^j$. Upon setting up permanent ground for the relay in the usual manner by throwing switch to contact 11, the additional armature $7^m$ will form the permanent connection for the one end of the relay, and also the connection for the valve coil. However, the connection at $6^j$ will be broken. This sets up the extra armature for initial current to the relay, so that upon cutting of wires no operation can be obtained unless this particular armature is connected up.

Figure 24:
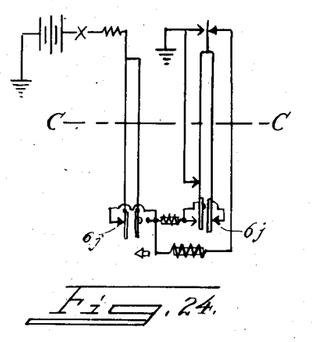

Figure 24 is a further development of Figure 23, in which there are two normally permanent armature contacts $6^j$ both of which are broken and new ones set up upon initial operation of the switch.

Figure 25:
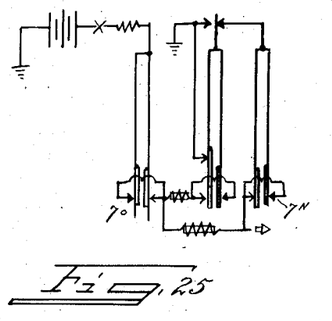

In Figure 25 the normally permanent and replacement armature device has been still further amplified by setting up the armatures $7^N$ and $7^o$ for the lock coil.

It will be noted that the forms in Figures 21 to 25 are camouflaging by means of armatures and the form shown in Figure 3 is a camouflaging by means of taps from the relay coils. Both forms may be used together, although for cheapness and simplicity, it is desirable to avoid an undue multiplication of armatures and contacts for the relay.

Locking points.

It will be recalled that the particular electrical control requiring sequential operation of a nature to insure locked condition whenever the car motor is running and not switched off, was stated by me to be useful in a number of vehicle locking mechanisms.

I have shown in Figures 5 to 9 a different application of my invention.

Figures 5, 6, 7, 8, 9:
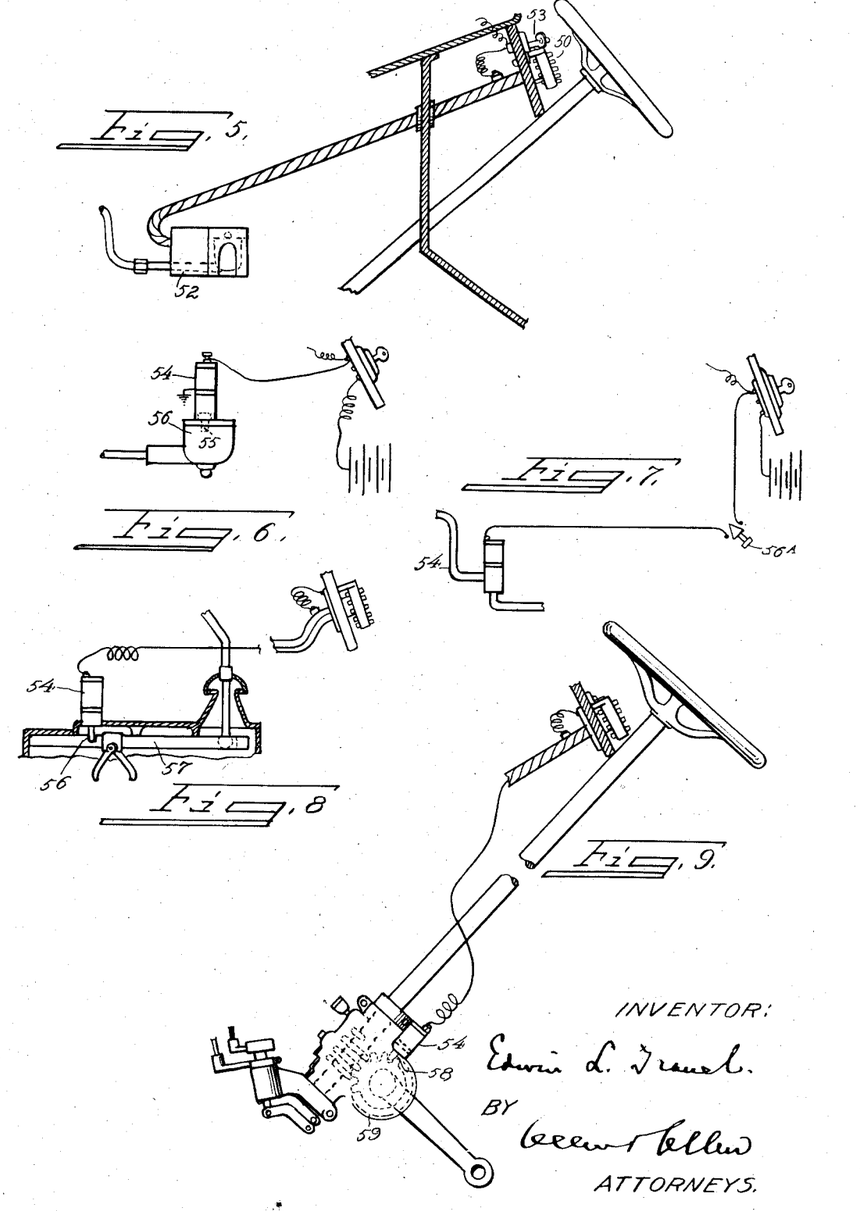
Figure 5 is a view showing in side elevation the arrangement of parts in a motor vehicle for the carbureter lock.
Figure 6 is a view showing a use of a mere gas saver connected with the ignition switch of a vehicle.
Figure 7 is a like view showing diagrammatically the use of the gas saver and carbureter lock with a button switch.
Figure 8 is a view showing the lock used to prevent shifting of gears.
Figure 9 is a view showing the lock used to prevent rotating of the steering wheel.

In Figure 5 is shown an instance in which the combination lock 50 is mounted on the vehicle dash. A box 52 is located just behind the engine carbureter, in which a lock valve may be incorporated and controlled by the lock coil 10 of my device, so as to shut off gasoline whenever the ignition key 53 is turned off.

This is my preferred form and will be described in detail.

I show in Figure 6 an instance in which the coils and connections are arranged in a box 54 over the float chamber 55 of a carbureter. In such case the armature or sliding core 56 will be employed to move the float to closing position, thereby preventing any gasoline from flowing into the carbureter mixing chamber and preventing flow of gas whenever the controlling element has been operated.

In Figure 7 is illustrated the use of the shut-off box 54 and also a button switch $56^A$ at some other point to control its operation. This switch may be concealed instead of being locked.

In Figure 8 is shown the use of the shut-off box 54 but in this instance the core 56 serves as a locking dog to hold the gear shifting lever bar 57 of the vehicle in a neutral position.

In Figure 9 the shut-off box 54 is shown as controlling a dog 58, which interposes itself into the steering gear as by engaging the worm gear 59 on the steering arm.

It will be obvious that any of the above briefly illustrated and described means of locking a vehicle will form effective means for use of my locking device.

I wish it understood that in the views above noted I do not attempt to show any casing structure which would be strong enough to resist the application of a heavy crow bar or the like, but by suitable mounting devices and proper hardness to metal parts this can readily be provided for.

I describe a preferred means of arranging for protection of the wiring and preventing tampering with the lock or its removal in connection with the particular gasoline lock illustrated in detail in the drawings.

Preferred form of vehicle lock.

I have selected for illustration of my invention a form of combination lock to be used in connection with whatever vehicle locking device is employed. This lock is not of my invention, and its use is not insisted upon.

Thus I have shown (Figs. 4, 1 and 1ª) a lock casing 60 having control buttons 61 by means of which the switch 62 is controlled. This switch is arranged in the casing so that when moved to one position it is locked, and when the button combination is operated it will spring of itself to another position. The position to which the switch springs corresponds to the movement of the diagram switch to contact 11, and the position to which it is moved and becomes locked is at diagram contact position 12.

The wires 9 and 9ª and 5ª are provided with taps to the switch mechanism. The switch contacts are mounted on a block 60ª of insulating material, and are formed by small bars 60ᵇ, like commutator bars, which bars project beyond the surface of the insulating piece. Mounted on the lock disk 61ª is a spring piece 62, which acts as the switch bar 8. To this piece is connected the wire 9. The finger button 61 is mounted on the disk 61ª and extends out through the lock casing to manipulate the disk. This disk of itself has the spring action referred to, so that it revolves a step in one direction when the lock is manipulated, and is held in place by the lock when reversely turned. One of the bars 60ᵇ forms the contact 11 and one the contact 12, and the bar contact 12 is connected to the wire 5ª, while the bar contact 11 is grounded by a wire marked 9ª. Thus the lock device forms a ground for the bar contact 11 and the main wire 9ª from the relay armature is also grounded to the device as by screw 99ª.

The spring 62 has a finger 62ª which acts as the switch contact and wipes the edges of the bars 60ᵇ.

The casing 60 is formed with the lock face spot welded onto a tubular member 63ᴬ which is elongated and through which the taps 9 and 5ª are led, leaving plenty of slack wire for ease in making connections. In the tube the wires 5 and 5ª are secured to the wire 3ª extending out laterally to the ignition switch. The tube is screwed into a barrel 64 (see Fig. 1) of hard metal having a lengthwise keyway 64ª. It has also an aperture for the wire 3ª.

The barrel is to be thrust through a hole in a vehicle dashboard 65; set against a shoulder 66 on the barrel is a washer 66ª adapted to engage a split mounting bushing 67. This bushing is held in the dash at one face by means of its flange 67ᴬ and the dowels 68 engaging holes in the dash. It is externally threaded.

The bushing is formed of two separate pieces, so that the device can be thrust through the dash and the halves of the bushing set in place, after which the lock casing is thrust toward the dash. The switch barrel 64 has a shoulder 68ª against which this bushing engages so that the halves of the bushing are housed between the washer 66ª and the shoulder 68ª.

The bushing is externally threaded and is adapted to be engaged by a nut 69 which is keyed by a pin 70 to slide along the keyway on the barrel 64. Thus in screwing up the nut 69 onto the bushing, the entire barrel must be revolved, while the bushing pieces stand still.

The number of turns of the barrel and nut, in order to pull the nut and bushing tightly together on the inside and outside of the dash, may be of the number desired. Say for the dash of usual thickness, as much as twenty turns could be provided, which would require twenty reverse turns to dismount the device.

The hollow flexible conduit 71 is formed of hard metal and is locked by means of set screws 72 to a bushing 73, which bushing is screwed into the one end of the barrel 64 along with the conduit. The wires within the conduit in the form of a cable 71ᴬ do not revolve with the conduit; and hence may be connected up with the taps in the tube 63ª that is mounted within the barrel, one of the wires, constituting the ignition switch connection 5ª, being shown as extending out through a hole in the barrel.

The entire device with the exception of the split bushing will be made up as a unit and be thrust through the dashboard and mounted in place by revolving the conduit and barrel. The conduit will be of such type that it will not twist, so that by anchoring the other end of the conduit it will not be possible to unscrew the parts from the dash after the carbureter lock casing is mounted without cutting the conduit.

The carbureter lock.

The magnet coil case is formed of hard steel, as shown at 80, leaving an offset at 81 for the carbureter connections. In this case is fixed a mounting block 82 having a socket 83 for connection with an inlet gasoline fitting 84. The socket 83 has a conical depression 83ª at its inner end, and a conduit for gasoline is formed in the block having a branch 84 and a branch 85. The branch 84 has also a socket 86 at its base, the socket 86 and depressions 83ª are for the purpose of catching a wire, should an attempt be made to pick the gasoline shut-off valve.

Threaded into a bore in the block is a plug 87, in which slides a valve 88 adapted to close the passage 89 through the plug. This passage registers with the conduit in the block and opens into a socket 90 for the outlet fitting 91.

The plug member has a shoulder 92 on which rests the head 93 of the valve plunger 88, this head being formed with a flange 94. The head flange is deeply notched at 93ª in the form of a clover leaf in cross section.

The lock coil of the diagrams is shown at 95, with its base screwed down onto the plug, and having its core piece 96 adjacent the head of the valve plunger. A spring 97 rests on the flange of this plunger head and the coil base.

The relay coil 98 is screwed to a shelf formed on the block and has the armature 99. The contacts are marked in the same manner as the contact in the diagram of Figure 2. The arm 100 on the armature 99 acts to make and break the contacts, said arm being mounted on the armature and swinging with it.

I have preferably fitted onto the end of the cable a square or rectangular block 101, preferably holding the cable by sawed-off set screws, which block seats in a rectangular notch 101ª in the case 80. The block is formed with a peripheral groove 102 which engages the case. The various contacts from the cable are secured to an insulation block 103 within the case.

The case will be mounted adjacent the carbureter float in a position between the carbureter and the engine, so that to get at it the carbureter will have to be dismounted. The float chamber 104 will be coupled to the outlet fitting of the case by the connections 105 located within the offset in the base of the case.

A hard steel cover is then applied to the whole assembly and secured against easy removal, said case having a face (not shown) directed outwardly from the engine, a base 106, a top 106ª covering the float chamber and case, a side wall 107 housing the top of the float chamber, and side walls 108 and 109 extending entirely along the sides of the case.

The wall 108 will have a clearance slot 110 to clear the connections with the float, and the wall 109 will have a slot 111 to clear the intake pipe fitting, and a square slot 112 to clear the inlet cable fitting block, thereby filling out the peripheral groove therein and holding the cable against removal.

I have not attempted to show in great detail the casing features of the lock, since these may be modified, the important point being that the cable cannot turn in the case, and that the passages through the valve block cannot be picked by a wire.

In operation the opening of the switch lock followed by a closing will set current into the lock coil and raise the valve, permitting the gasoline to flow. If anything happens to the current from tampering or otherwise, as the wire being cut, or the fuse blown, or the ignition switch being turned off, the valve will drop by gravity and its spring.

By the clearances provided through the clover leaf design of the plunger-like valve device I equalize the pressure on it so that applying excessive pressure to the gasoline line will not force up the valve. The head and flange of the valve are cut with deep notches 93ª so as to permit the gasoline to flow easily into the spring chamber.

In the device described in detail both electrically and mechanically the following features are to be noted. In the first place, it is impossible to forget to lock the car when stopping, as it is locked automatically by shutting off the engine ignition. During coasting with ignition off there will be no waste of gasoline, and no gasoline will get into the engine cylinders and crank case, so as to destroy the lubricant therein. Also, leakage through the carbureter when standing is eliminated.

The car can be run a short distance on the gasoline in the float chamber, thereby getting out of danger in case of forgetfulness or lack of time to set the lock. After running a short distance it will begin to spit and back-fire, giving an unmistakable indication that the lock must be operated.

In case of stalling the engine, no lock operation is necessary to get out of danger, and yet whenever the car is left standing, the owner is protected against himself forgetting to apply his lock.

The amount of current used by the 50 and 100 ohm coils is so small that whenever the battery has any strength whatever, the lock will operate. If the battery dies out or its connections fall off, the car will become locked, which could never happen while the engine was running, as no ignition would be operating either.

There is no inhibition of the car being moved, as to remove an obstruction to traffic, and if any one is seen towing away a car having the lock, the police should stop the tractor vehicle and ask the occupant to operate the lock. If he cannot do so, then he will be held until authority is obtained from the owner of the car.

With a shiftable combination lock the owner can telephone the combination to a garage or a friend, and permit him to use the car without a key.

By means of camouflaging circuits the cutting of the cable will not supply a ready means of operating the lock electrically.

In the preferred circuit inductive tampering in an attempt to get the coils to operate would be blocked by the magnetic insulation of the lock case, and also the lock coil will be shorted so as to prevent any appreciable current going through it.

In the mechanical arrangement of the wiring any cutting of the cable will also cut the ground wire, which is arranged in the lock barrel and in addition to his other troubles, the thief will have to find the ground wire. Also, with the ground wire of the relay armature brought up into the barrel, the chances are good of short circuiting the ignition switch and burning out the fuse. The fuse can be very sensitive, since the operating current used in the lock is very small.

The make-before-break contact in the preferred form of device will react with the camouflaging wires to give a buzzing effect upon forming new ground connections shorting the switch 8 so as to establish contact 12.

As to the lock switch, it and the carbureter or other coil case are manufactured as a unit and placed into the vehicle without alteration. The manner of inserting the lock barrel has been noted, whereby revolution of the cable is required before same can be dismounted. The coil case can be mounted on the rear side of any usual carbureter, and set so that the carbureter lies in the way of its removal without taking off the carbureter.

Thus it is apparent that to start tampering with my lock it will be easiest to first take off the carbureter, and if this is done, the easiest thing would be to put another carbureter on in place of it, and form a new coupling for the gasoline pipe.

The time that it would take to do this is ample for protection of any vehicle from theft, in instances where the thief has a limited time to get in his work. Of course, no lock would prevent a thief from taking a car if he is free from observation over a number of hours. Such a lock would create too much difficulty if it got out of order.

Having thus described my invention, what I claim as new and desire to secure by Letters Patent, is:—

1. A lock control device comprising a member having two positions, an open position and one which is secured against tampering as by a lock, lock operating mechanism comprising two movable units, means for energizing one unit by moving the said member to open position and means for energizing the other by moving said member to secured position, both of said units requiring operation to effectuate a complete energization of the lock operating mechanism.

2. A lock control device comprising a lock member, a means for moving the lock member out of locked position, a setting means adapted to hold said first mentioned means out of operation except upon sequential operation therewith, and a lock controlled means adapted upon opening of the member to accomplish energization of the setting means, and means adapted upon closing of the member to accomplish energization of the lock moving means.

3. In a lock for electrically controlled means, a switch for connecting current to said electrically controlled means, and a lock for preventing unauthorized operation of the said means, an electro-magnet for controlling the said lock energized through the said switch, and a relay for connecting said magnet with said switch and devices for controlling the relay and magnet.

4. In a lock for electrically controlled means, a switch for connecting power to said electrically controlled means, and a lock for preventing unauthorized operation of the said means, an electro-magnet for controlling the said lock energized through the said switch, and a relay for connecting said magnet with said switch and devices for controlling the relay and magnet, said devices including a movable member adapted to send current first to the relay and second to the switch, and a lock to hold the member in said second position automatically.

5. In combination, a lock controlled switch having a locked and unlocked position, a relay connected with power when the switch is in unlocked position, and a magnet coil connected with power after an operation of the relay when the switch is in locked position, and a member to be operated by said magnet coil.

6. In combination, a lock controlled switch having a locked and unlocked position, a relay connected with power when the switch is in unlocked position, and a magnet coil connected with power after an operation of the relay when the switch is in locked position, and a member to be operated by said magnet coil, said member comprising a locking device.

7. In combination, a lock controlled switch having a locked and unlocked position, a relay connected with power when the switch is in unlocked position, and a magnet coil connected with power after an operation of the relay when the switch is in locked position, an electric mechanism, a switch therefor, controlling application of power to the mechanism and the relay and magnet, said magnet coil being adapted to operate a lock for the electric mechanism, whereby the opening of the mechanism switch will release the relay and magnet, requiring a sequential operation prior to release of the electric mechanism for operation.

8. In combination, a relay and a magnet coil, a switch having two positions, a source of electric energy, said relay having armature means for coupling the magnet coil with the switch and source of energy, and said armature means being adapted also to permanently hold the relay under energization irrespective of the switch, one of the switch positions sending current to the relay and the other sending it to the magnet coil.

9. In combination, a relay and a magnet coil, a switch having two positions, a source of electric energy, said relay having armature means for coupling the magnet coil with the switch and source of energy, and said armature means being adapted also to permanently hold the relay under energization irrespective of the switch, one of the switch positions sending current to the relay and the other sending it to the magnet coil, and a lock for automatically holding the switch in its second position above named.

10. In a motor vehicle lock, the combination with the ignition switch, of electric means for locking the vehicle, energized through the ignition switch, and normally in locking position when said switch is open, and a normally locked element required to be first unlocked and then locked again prior to coupling the electric means and the ignition switch for movement thereof to unlocked position.

11. A motor vehicle lock or the like, comprising a member to lock the vehicle, said member being normally in locking position, a member such as the ignition switch requiring operation before the vehicle can be driven, said member being adapted to furnish the operative power to the lock, and additional means requiring a setting to couple the said operative power between the lock and the said member.

12. A motor vehicle lock or the like, comprising a member to lock the vehicle, said member being normally locked, a member such as the ignition switch requiring operation before the vehicle can be driven, said member being adapted to furnish the operative power to the lock, and additional means requiring a setting to couple the said operative power between the lock and the said member, said additional means including a lock to hold it in position after a setting.

13. A motor vehicle lock or the like, comprising a member to lock the vehicle, said member being normally locked, a member such as the ignition switch requiring operation before the vehicle can be driven, said member being adapted to furnish the operative power to the lock, and additional means requiring a setting to couple the said operative power between the lock and the said member, said additional means including a lock acting automatically to hold it in set position and requiring a release prior to the possibility of another setting.

14. In a motor vehicle lock, a device for locking the vehicle, including an ignition switch for the vehicle and another switch having a lock for holding it in at least one of its positions, said vehicle locking device being electrically controlled, and the wiring being so arranged that to hold the lock in released position the ignition switch must always be closed, and to permit the ignition switch to energize the lock the lock switch must be in locked position.

15. In a motor vehicle lock, a device for locking the vehicle, including an ignition switch for the vehicle, which must always be closed to hold the locking device in unlocked position, and an additional switch requiring an opening followed by a closing to couple the ignition switch with the locking device.

16. In a motor vehicle lock, a device for locking the vehicle, including an ignition switch for the vehicle, which must always be closed to hold the locking device in unlocked position, and an additional switch requiring an opening followed by a closing to couple the ignition switch with the locking device, and means for automatically retaining said additional switch in its closed position.

17. In a motor vehicle lock, a device for locking the vehicle, including an ignition switch for the vehicle which must always be closed to hold the locking device in unlocked position, a relay, and a magnet coil for operating the locking device, said relay controlling application of power to the magnet coil, and a double throw additional switch adapted in one position to operate the relay, and in the other to operate the magnet coil when the ignition switch is closed.

18. In a motor vehicle, a locking device therefor, and lock controlled means operable to locked and unlocked position, and requiring to be first unlocked and then locked again before the locking device can be operated to move to unlocked position.

19. In a motor vehicle, a locking device therefor, and lock controlled means operable to locked and unlocked position, and requiring to be first unlocked and then locked again before the locking device can be operated to move to unlocked position, and means whereby the voluntary stopping of the vehicle engine will throw the lock into locked position irrespective of the position of the lock controlled means.

20. In a motor vehicle, the combination of an electrically operated vehicle lock, another lock to be controlled by an authorized person, means controlled by stoppage of the motor for releasing the vehicle lock for movement to locking position, and means controlled by the other lock for moving the vehicle lock to unlocking position.

21. In a motor vehicle, a locking device therefor, and lock controlled means operable to locked and unlocked position, and requiring to be first unlocked and then locked again before the locking device can be operated to move to unlocked position, and means whereby the voluntary stopping of the vehicle engine will throw the lock into locked position irrespective of the position of the lock controlled means, and said lock controlled means being adapted to lock the locking device whenever the former is moved to unlocked position.

22. In a motor vehicle, the combination with an ignition switch, of an electro-magnet, a fuel valve adapted to permit access of fuel to the engine upon energization of the said magnet but to cut off access when said magnet is de-energized, said magnet connected so as to receive current only through the ignition switch, and an independent member adapted to cut off current from the said magnet.

23. In a motor vehicle, the combination with an ignition switch, of an electro-magnet, a fuel valve adapted to permit access of fuel to the engine upon energization of the said magnet but to cut off access when said magnet is de-energized, said magnet connected so as to receive current only through the ignition switch, and an independent member adapted to cut off current from the said magnet, said member being lock controlled.

24. In a motor vehicle, the combination with an ignition switch, of an electro-magnet, a fuel valve adapted to permit access of fuel to the engine upon energization of the said magnet but to cut off access when said magnet is de-energized, said magnet connected so as to receive current only through the ignition switch, and an independent member adapted to cut off current from the said magnet, said member including a relay and a lock, and connected so that opening of the lock sets the relay, and closing of it again connects the magnet into circuit with the ignition switch.

25. In a motor vehicle, the combination with an ignition switch, of an electro-magnet, a fuel valve adapted to permit access of fuel to the engine upon energization of the said magnet, but to cut off fuel upon de-energization thereof, said magnet connected so as to receive current only through the ignition switch, and a normally locked element required to be first unlocked and then locked prior to coupling the electro-magnet in circuit with the ignition switch.

26. In a motor vehicle, a fuel cut-off valve, an ignition switch, electric power means to open the valve energized through the ignition switch, a relay energized through the ignition switch for connecting the power means in circuit with said ignition switch, and a two-pole switch adapted upon one movement thereof to couple in the relay with the ignition switch circuit, and by a subsequent operation in its other movement to couple the power means in said circuit.

27. In a motor vehicle, a fuel cut-off valve, an ignition switch, electric power means to open the valve energized through the ignition switch, a relay energized through the ignition switch for connecting the power means in circuit with said ignition switch, and a two-pole switch adapted upon one movement thereof to couple in the relay with the ignition switch circuit, and by a subsequent operation in its other movement to couple the power means in said circuit, and a lock to hold the two-pole switch in the second position last above noted.

28. In a motor vehicle, the combination with the carbureter thereof, of a casing interposed between the fuel supply pipe and the carbureter and fuel cut-off valve in said casing, adapted to cut off the passage of fuel to the carbureter, and electro-magnetic means for operating said valve, including electric wires enclosed in a lock switch at the one end of the conduit, and a plurality of electric wires located in said conduit, but not connected so as to affect said magnetic means.

29. In a motor vehicle, an electro-magnetically controlled lock including a casing within which the electro-magnetic means is enclosed, a casing in which a lock and switch is enclosed, and a conduit connecting said two casings, electric conductor wires in the conduit extending from the switch to the magnetic means, and additional wires in the conduit, having no operable connection with the said magnetic means.

30. In a motor vehicle an electro-magnetically controlled lock including a casing within which the electro-magnetic means is enclosed, a casing in which a lock and switch is enclosed, a conduit connecting said two casings, electric conductor wires extending from the switch to the magnetic means in the conduit, including a ground wire connected to the magnetic means and extended up to the switch and lock casing where the ground connection is made.

31. In a motor vehicle an electro-magnetically controlled lock including a casing within which the electro-magnetic means is enclosed, a casing in which a lock and switch is enclosed, a conduit connecting said two casings, electric conductor wires extending from the switch to the magnetic means in the conduit, including a ground wire connected to the magnetic means and extended up to the switch and lock casing where the ground connection is made, and wires connected by taps to the magnetic means and extending through the conduit and unconnected with the switch, whereby an exposure of the wires by cutting the conduit will prevent a by-passing of the switch within the lock casing without expenditure of long effort.

32. In a lock circuit, the combination of a double throw switch enclosed in a casing, and a lock in said casing for controlling the operation of the switch, a relay, and an electro-magnet connected to the switch and its contacts, said relay including an armature having relay circuit establishing means independent of the switch and the armature having circuit establishing functions for the magnet, and a conduit in which required wires extend from the relay and magnet to the switch, said conduit having therein additional wires connected with selected portions of the circuits of the relay, magnet and armature, said wires being so arranged that coupling them together or with the required wires will not result in an effective operation of the relay or magnet.

33. In a lock for motor vehicles having electric operating means, a conduit for wiring, a lock for mounting at a convenient point, said lock including a member into which the conduit is screwed, and a lock casing united as a unit, a non-revoluble member into which the said unit is to be mounted, and a slidable but non-rotatable member on said unit adapted to be screwed onto the non-revoluble member.

34. In an automobile, an ignition switch, a lock to prevent operation of the vehicle, and means controlled by the switch to set the lock to locking position.

35. In an automobile, an engine ignition switch, a lock adapted to shut off flow of motive fuel to the engine, and means controlled by the switch to set the lock to fuel shut-off position.

36. A mechanism having a member to be manipulated as a necessary step to operation, a restrictive device acting on said mechanism, a third member said restrictive device controlled by manipulation of said member, and by a third member, said third member having a cycle of movement through which it must be passed to control the restrictive device.

37. A driving restriction device for a mechanism, and a member forming a part of the operative functions of the mechanism, said member adapted when in condition of non-exercise of its function to set said device to restrictive position.

38. A driving restriction device for a mechanism, and a member forming a part of the operative functions of the mechanism, said member adapted when in condition of non-exercise of its function to set said device to restrictive position, and a third member requiring operation for moving said device to a non-restricting position.

39. A driving restriction device for a mechanism, and a member forming a part of the operative functions of the mechanism, said member adapted when in condition of non-exercise of its function to set said device to restrictive position, and a third member requiring operation for moving said device to a non-restricting position, said third member having a cycle of movement through which it must pass to provide said non-restrictive movement.

40. A driving restriction device for a mechanism, and a member forming a part of the operative functions of the mechanism, said member adapted when in condition of non-exercise of its function to set said device to restrictive position, and a third member requiring operation for moving said device to a non-restricting position, said third member having a cycle of movement through which it must pass to provide said non-restrictive movement, and a lock for automatically retaining the said third member in position at the close of each cycle.

EDWIN L. GRAUEL.